United States Patent
He et al.

(10) Patent No.: US 11,330,584 B2
(45) Date of Patent: May 10, 2022

(54) INTERFERENCE MANAGEMENT WITH ADAPTIVE RESOURCE BLOCK ALLOCATION

(71) Applicant: QUALCOMM Incorporated, San Diego, CA (US)

(72) Inventors: Xiaoyin He, San Diego, CA (US); Peter Pui Lok Ang, San Diego, CA (US); Krishna Kiran Mukkavilli, San Diego, CA (US); Joseph Patrick Burke, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 16/907,789

(22) Filed: Jun. 22, 2020

(65) Prior Publication Data

US 2020/0322950 A1 Oct. 8, 2020

Related U.S. Application Data

(62) Division of application No. 15/354,767, filed on Nov. 17, 2016, now Pat. No. 10,708,907.

(Continued)

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0042* (2013.01); *H04L 5/0073* (2013.01);
(Continued)

(58) Field of Classification Search
None
See application file for complete search history.

(56) References Cited

U.S. PATENT DOCUMENTS 10,091,766 B2 * 10/2018 Chen ............... H04J 11/005
10,708,907 B2 7/2020 He et al.
(Continued)

FOREIGN PATENT DOCUMENTS

CN 101960900 A 1/2011
CN 103582000 A 2/2014
(Continued)

OTHER PUBLICATIONS

International Preliminary Report on Patentability—PCT/US2017/021142, The International Bureau of WIPO—Geneva, Switzerland, dated Mar. 9, 2018.

(Continued)

*Primary Examiner* — Ayaz R Sheikh
*Assistant Examiner* — Faiyazkhan Ghafoerkhan
(74) *Attorney, Agent, or Firm* — Qualcomm Incorporated

(57) ABSTRACT

Certain aspects of the present disclosure relate to methods and apparatus for interference management with adaptive resource block (RB) allocation. In an exemplary method, a base station (BS) obtains an indication that downlink transmissions to a first user equipment (UE) potentially interfere with uplink transmissions by a second UE, the BS dynamically allocates, based on the indication, a first set of one or more resource blocks (RBs) for the downlink transmissions to the first UE, and the BS then transmits an indication of the first set of RBs to the first UE. Other aspects, embodiments, and features are also claimed and described.

15 Claims, 14 Drawing Sheets

Related U.S. Application Data

(60) Provisional application No. 62/324,653, filed on Apr. 19, 2016.

(51) Int. Cl.
*H04W 72/08* (2009.01)
*H04L 7/033* (2006.01)
*H04J 11/00* (2006.01)
*H04W 72/00* (2009.01)

(52) U.S. Cl.
CPC .......... *H04L 5/0094* (2013.01); *H04L 7/0331* (2013.01); *H04W 72/042* (2013.01); *H04W 72/0413* (2013.01); *H04W 72/082* (2013.01); *H04J 11/005* (2013.01); *H04W 72/00* (2013.01)

(56) References Cited

U.S. PATENT DOCUMENTS

| | | | |
|---|---|---|---|
| 2004/0131124 A1* | 7/2004 | Arambepola | H04L 1/0001 375/260 |
| 2004/0228426 A1* | 11/2004 | Oh | H04B 1/1036 375/346 |
| 2009/0170445 A1* | 7/2009 | Wang | H04B 1/1027 455/77 |
| 2010/0238888 A1* | 9/2010 | Sampath | H04W 24/02 370/329 |
| 2011/0051672 A1* | 3/2011 | Lee | H04L 5/0053 370/329 |
| 2011/0116570 A1* | 5/2011 | Kim | H04J 11/005 375/295 |
| 2011/0249646 A1* | 10/2011 | Lee | H04L 5/0091 370/329 |
| 2011/0292890 A1* | 12/2011 | Kulkarni | H04W 72/0426 370/329 |
| 2011/0294514 A1* | 12/2011 | Kulkarni | H04W 72/0426 455/450 |
| 2012/0082061 A1* | 4/2012 | Lysejko | H04L 5/0073 370/254 |
| 2012/0202545 A1* | 8/2012 | Nakayama | H04W 72/082 455/509 |
| 2012/0202546 A1* | 8/2012 | Nakayama | H04W 72/082 455/509 |
| 2012/0208546 A1* | 8/2012 | Nakayama | H04W 72/082 455/452.1 |
| 2012/0225688 A1* | 9/2012 | Yamazaki | H04W 72/082 455/522 |
| 2012/0231746 A1* | 9/2012 | Yamazaki | H04L 5/0073 455/67.13 |
| 2012/0329497 A1* | 12/2012 | Yamazaki | H04W 28/04 455/501 |
| 2013/0121222 A1* | 5/2013 | Luo | H04W 36/0061 370/311 |
| 2013/0208826 A1* | 8/2013 | Asuri | H04B 1/0475 375/296 |
| 2013/0242939 A1* | 9/2013 | Wagner | H04B 1/525 370/331 |
| 2013/0294361 A1* | 11/2013 | Chen | H04L 5/0094 370/329 |
| 2013/0315178 A1* | 11/2013 | Lee | H04W 72/0406 370/329 |
| 2013/0324112 A1* | 12/2013 | Jechoux | H04W 72/1215 455/426.1 |
| 2013/0324113 A1* | 12/2013 | Jechoux | H04W 74/004 455/426.1 |
| 2014/0241290 A1* | 8/2014 | Zhang | H04W 72/1247 370/329 |
| 2014/0293843 A1* | 10/2014 | Papasakellariou | H04L 1/00 370/280 |
| 2014/0293937 A1* | 10/2014 | Lee | H04W 72/1289 370/329 |
| 2014/0321303 A1* | 10/2014 | Iyer | H04L 43/50 370/252 |
| 2015/0098523 A1* | 4/2015 | Lim | H03F 1/0227 375/297 |
| 2015/0111592 A1* | 4/2015 | Chang | H04W 16/10 455/452.1 |
| 2015/0230258 A1* | 8/2015 | Kwon | H04W 72/082 370/280 |
| 2015/0264683 A1* | 9/2015 | Kim | H04L 5/0007 370/329 |
| 2015/0334653 A1* | 11/2015 | Ang | H04W 52/0261 370/311 |
| 2016/0028533 A1* | 1/2016 | Kazmi | H04W 72/0413 370/296 |
| 2016/0100412 A1* | 4/2016 | Shin | H04W 76/23 370/336 |
| 2016/0113028 A1* | 4/2016 | Caretti | H04W 72/121 370/336 |
| 2017/0013553 A1* | 1/2017 | Huang | H04W 48/08 |
| 2017/0111887 A1* | 4/2017 | Hong | H04B 17/345 |
| 2017/0303274 A1* | 10/2017 | He | H04L 7/0331 |
| 2017/0311192 A1* | 10/2017 | Noh | H04L 5/0048 |
| 2017/0331595 A1* | 11/2017 | Rudolf | H04L 1/1887 |
| 2017/0338930 A1* | 11/2017 | Lee | H04W 72/042 |
| 2020/0044781 A1* | 2/2020 | Rudolf | H04L 1/1887 |
| 2020/0322950 A1* | 10/2020 | He | H04L 5/0042 |

FOREIGN PATENT DOCUMENTS

| | | |
|---|---|---|
| EP | 1122895 A1 | 8/2001 |
| EP | 2991242 A1 | 3/2016 |
| WO | 2009061122 A2 | 5/2009 |
| WO | 2010108150 A1 | 9/2010 |
| WO | 2012171093 A1 | 12/2012 |
| WO | 2013067929 A1 | 5/2013 |
| WO | 2014165468 A1 | 10/2014 |
| WO | 2016036111 A1 | 3/2016 |
| WO | 2016052980 A1 | 4/2016 |

OTHER PUBLICATIONS

International Search Report and Written Opinion—PCT/US2017/021142—ISA/EPO—dated May 24, 2017.
Response to ISR/WO- Chapter II Demand and Art. 34 Amendment as filed Sep. 14, 2017, 23 pages.
Venkatasubramanian V., et al., "On the Performance Gain of Flexible UL/DL TDD with Centralized and Decentralized Resource allocation in Dense 5G Deployments," IEEE 25th Annual International Symposium on Personal, Indoor, and Mobile Radio Communication (PIMRC), Sep. 2014, pp. 1840-1845.

* cited by examiner

INTERFERENCE MANAGEMENT WITH ADAPTIVE RESOURCE BLOCK ALLOCATION

CROSS-REFERENCE TO RELATED APPLICATIONS

This Divisional Application for Patent is a divisional application of and claims priority to U.S. patent application Ser. No. 15/354,767, filed Nov. 17, 2016, which claims priority to Provisional Application No. 62/324,653, filed Apr. 19, 2016, which are all assigned to the assignee of the present application and hereby expressly incorporated by reference herein in their entirety for all applicable purposes.

TECHNICAL FIELD

The present disclosure relates generally to communication systems, and more particularly, to methods and apparatus for interference management with adaptive resource block (RB) allocation. Certain embodiments enable and provide techniques capable of improving interference conditions and dynamic channel resource allocation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

Multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further technical improvements.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Certain aspects of the present disclosure provide a method for wireless communications by a base station (BS). The method generally includes obtaining a first indication that downlink communications to a first user equipment (UE) potentially interfere with uplink communications by a second UE, dynamically allocating, based on the first indication, a first set of one or more resource blocks (RBs) for the downlink communications to the first UE or a second set of one or more RBs for the uplink communications by the second UE, and transmitting a second indication of the first set of RBs to the first UE or a second indication of the second set of RBs to the second UE.

Certain aspects of the present disclosure provide a method for wireless communications by a user equipment (UE). The method generally includes receiving, from a base station (BS), an indication of a first set of resource blocks (RBs) to receive a first downlink (DL) transmission in a time interval, receiving, from the BS, an indication of a dynamically allocated second set of RBs to receive a second DL transmission from the BS in the time interval, and altering one or more parameters of a receiver, based on the second set of RBs, when receiving the second DL transmission on the second set of RBs.

Certain aspects of the present disclosure provide an apparatus for wireless communications. The apparatus generally includes a receiver, a processor configured to obtain an indication of a first set of resource blocks (RBs) to receive a first downlink (DL) transmission from a base station (BS) in a time interval, to obtain an indication of a dynamically allocated second set of RBs to receive a second DL transmission from the BS in the time interval, and to alter one or more parameters of the receiver, based on the second set of RBs, when the apparatus is receiving the second DL transmission on the second set of RBs, and a memory coupled with the processor.

Certain aspects of the present disclosure provide an apparatus for wireless communications. The apparatus generally includes a transmitter, a processor configured to obtain a first indication that downlink communications to a first user equipment (UE) potentially interfere with uplink communications by a second UE, to dynamically allocate, based on the first indication, a first set of one or more resource blocks (RBs) for the downlink transmissions to the first UE or a second set of one or more RBs for the uplink transmissions by the second UE, and to cause the transmitter to transmit a second indication of the first set of RBs to the first UE or a second indication of the second set of RBs to the second UE, and a memory coupled with the processor.

Various processor-based apparatus and computer-program products for performing the above referenced methods are also provided.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
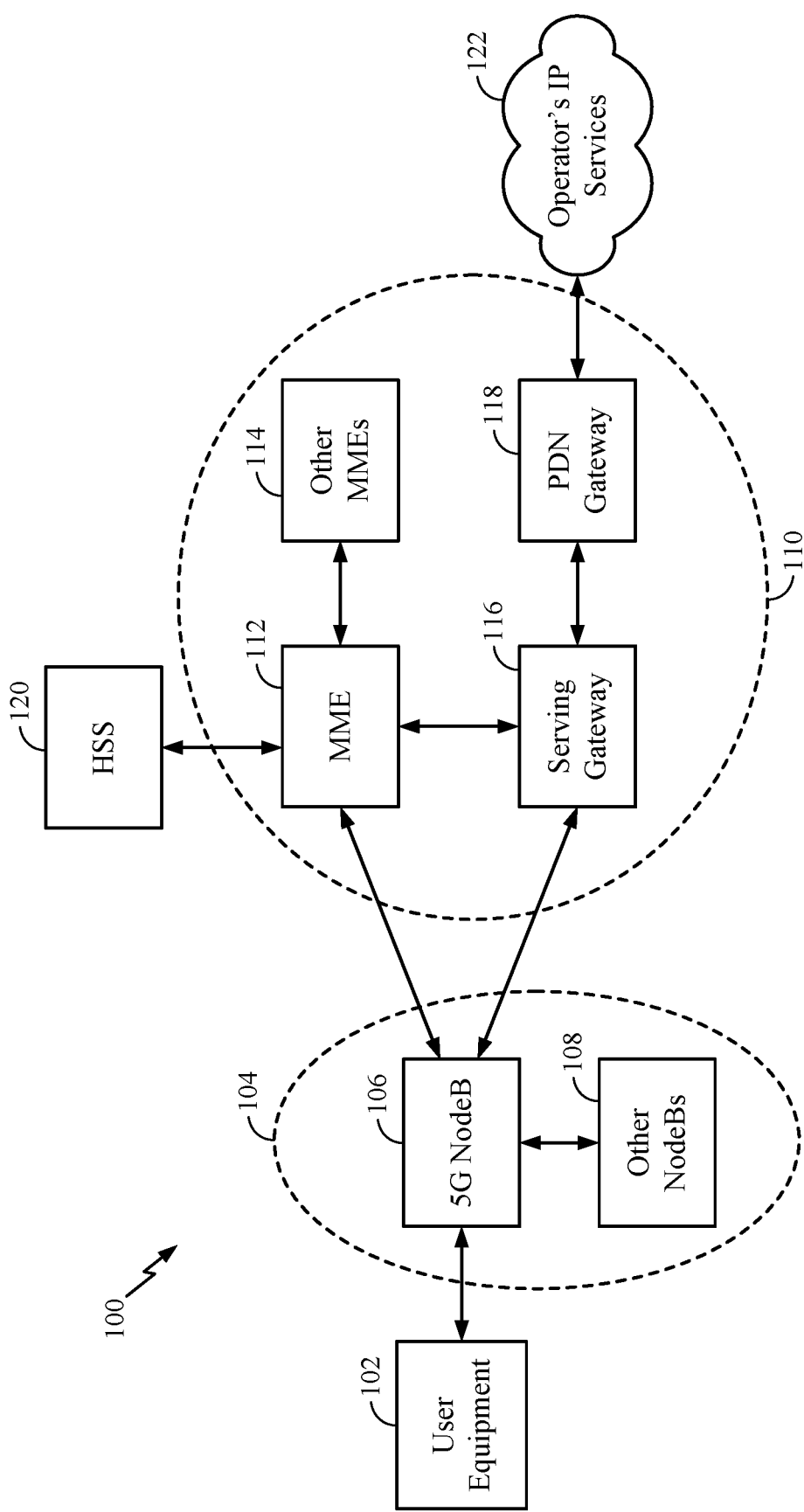
FIG. 1 is a diagram illustrating an example of a network architecture, according to some aspects of the present disclosure.

Aspects of the present disclosure may help mitigate interference caused by one base station to another base station (e.g., eNB-eNB interference) and/or interference caused by one user equipment to another user equipment (e.g., UE-UE interference). These techniques may reduce Node B-Node B (e.g., 5th generation (5G) Node B), and/or UE-UE interference in wireless communications systems by dynamically changing channel resource allocations and/or altering receiver parameters to improve a capability of the receiver to filter out interfering transmissions.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

For clarity, while the present disclosure may be described herein using terminology commonly associated with 3G and/or 4G wireless technologies, aspects of the present disclosure can be applied in other generation-based communication systems, such as 5G and later, including new radio (NR) technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). NR cell may refer to a cell operating according to the new air interface or fixed transport layer. A NR Node B (e.g., a 5G Node B) may correspond to one or multiple transmission and reception points (TRPs).

NR cells can be configured as access cell (ACells) or data only cells (DCells). For example, the radio access network (e.g., a central unit or distributed unit) can configure the cells. DCells may be cells used for carrier aggregation or dual connectivity, but not used for initial access, cell selection/reselection, or handover. In some cases, DCells may not transmit synchronization signals (SS); in other cases DCells may transmit SS. TRPs may transmit downlink signals to UEs indicating the cell type. Based on a cell type indication, a UE may communicate with the TRP. For example, the UE may determine TRPs to consider for cell selection, access, handover, and/or measurement based on the indicated cell type.

FIG. 1 is a diagram illustrating an exemplary network architecture 100 of a network in which aspects of the present disclosure may be practiced. The network architecture 100 may include one or more user equipment (UE) 102, a Radio Access Network (RAN) 104, a core network (CN) 110, a Home Subscriber Server (HSS) 120, and an Operator's Internet Protocol (IP) Services 122. The network can interconnect with other access networks, but for simplicity those entities/interfaces are not shown. Exemplary other access networks may include an IP Multimedia Subsystem (IMS) Packet Data Network (PDN), Internet PDN, Administrative PDN (e.g., Provisioning PDN), carrier-specific PDN, operator-specific PDN, and/or GPS PDN. As shown, the network provides packet-switched services, however, as those skilled in the art will readily appreciate, the various concepts presented throughout this disclosure may be extended to networks providing circuit-switched services.

The RAN includes the 5G NodeB (e.g., a TRP) 106 and other NodeBs 108. The 5G NodeB 106 provides user and control plane protocol terminations toward the UE 102. The 5G NodeB 106 may be connected to the other NodeBs 108 via an X2 or other type of interface (e.g., backhaul). The 5G NodeB 106 may also be referred to as a base station, a base transceiver station, a radio base station, a radio transceiver, a transceiver function, a basic service set (BSS), an extended service set (ESS), a transmission and reception point, or some other suitable terminology. The 5G NodeB 106 provides an access point to the CN 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
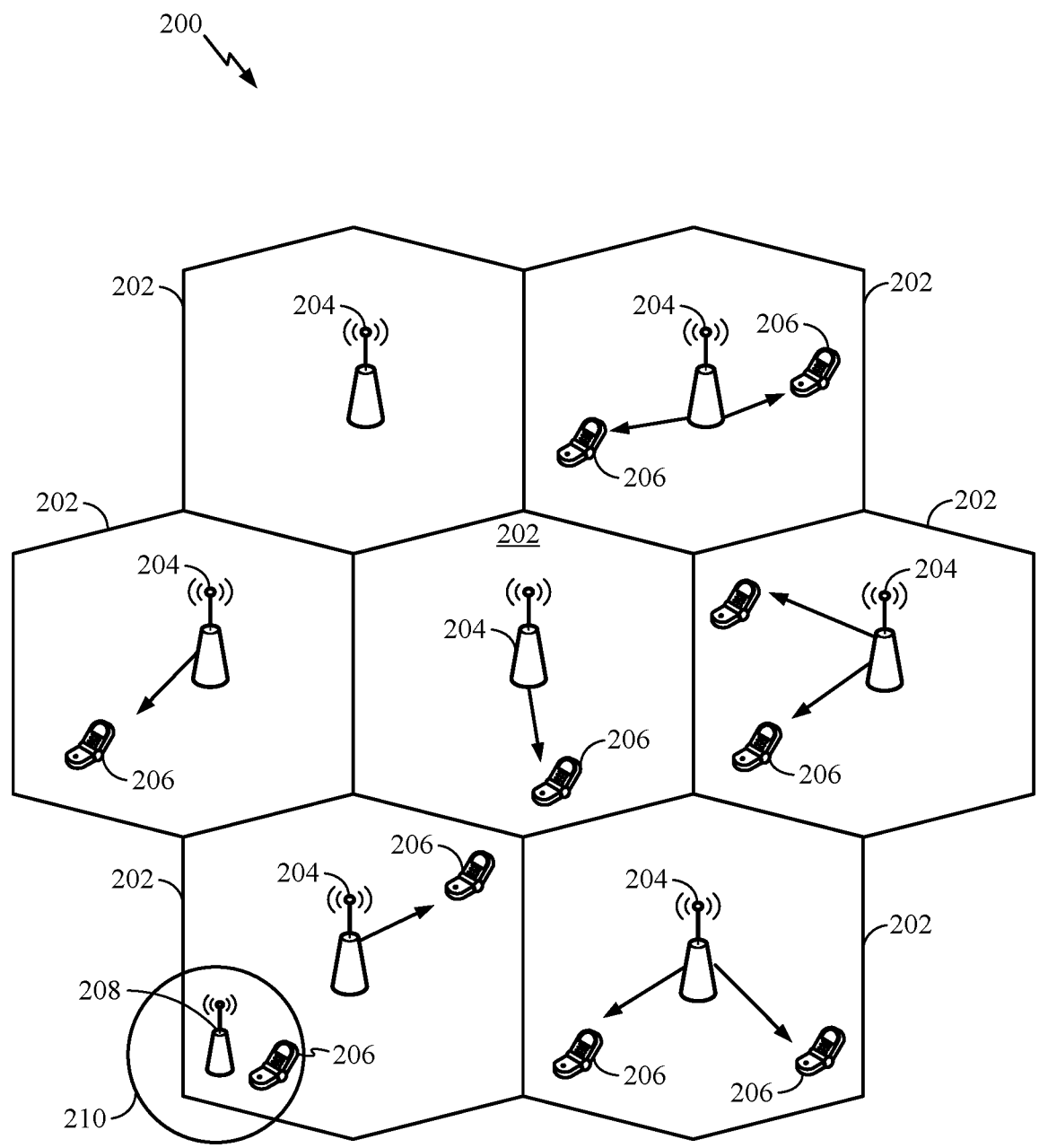
FIG. 2 is a diagram illustrating an example of an access network, according to some aspects of the present disclosure.

FIG. 2 is a diagram illustrating an example of an access network 200 in the network architecture illustrated in FIG. 1. In this example, the access network 200 is divided into a number of cellular regions (cells) 202. One or more lower power class NodeBs 208 may have cellular regions 210 that overlap with one or more of the cells 202. A lower power class NodeB 208 may be referred to as a remote radio head (RRH). The lower power class eNB 208 may be a femto cell (e.g., home eNB (HeNB)), pico cell, or micro cell. The macro NodeBs 204 are each assigned to a respective cell 202 and are configured to provide an access point to the CN 110 for all the UEs 206 in the cells 202. There is no centralized controller in this example of an access network 200, but a centralized controller may be used in alternative configurations. The NodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE, 5G, and NR applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
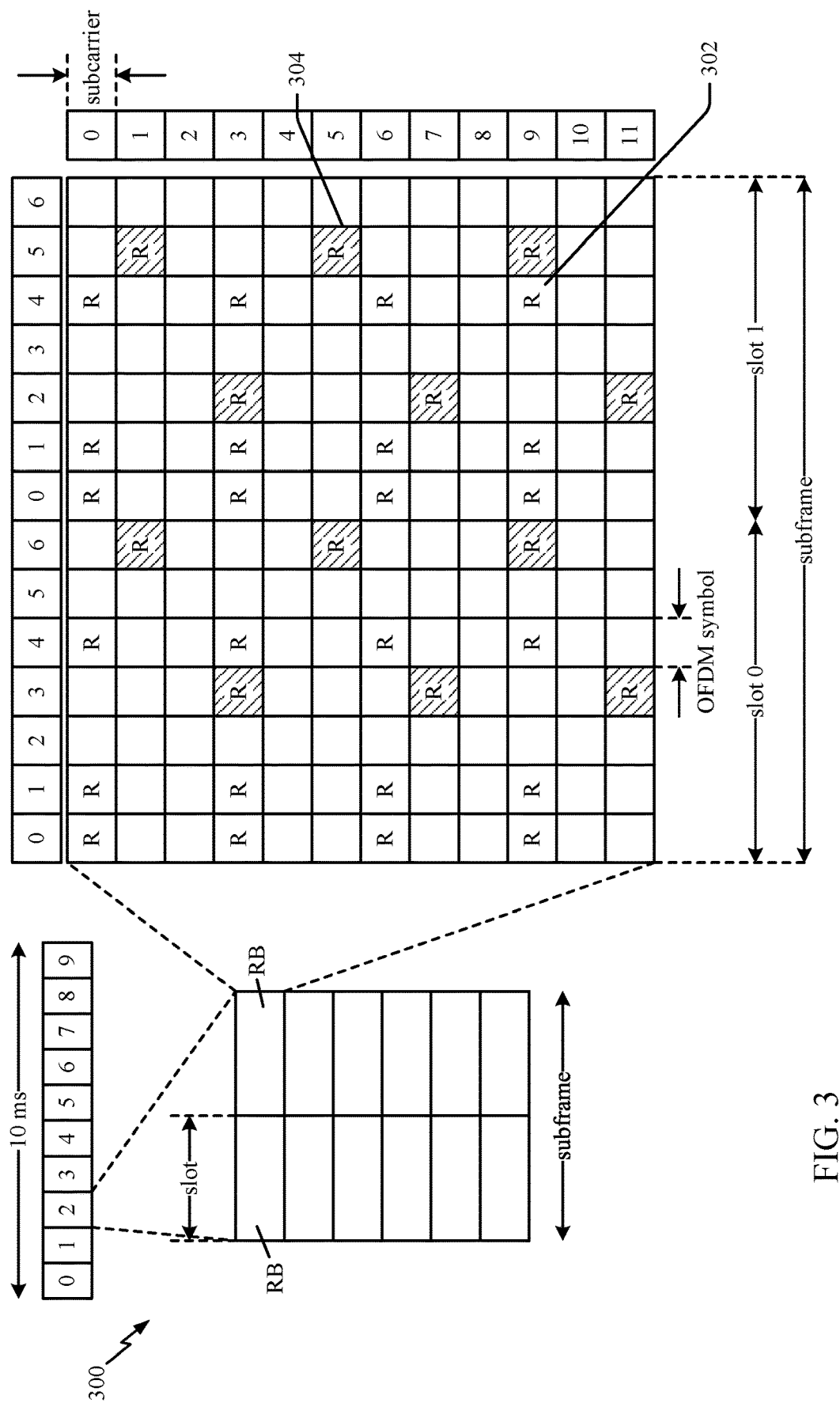
FIG. 3 is a diagram illustrating an example of a DL frame structure, according to some aspects of the present disclosure.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
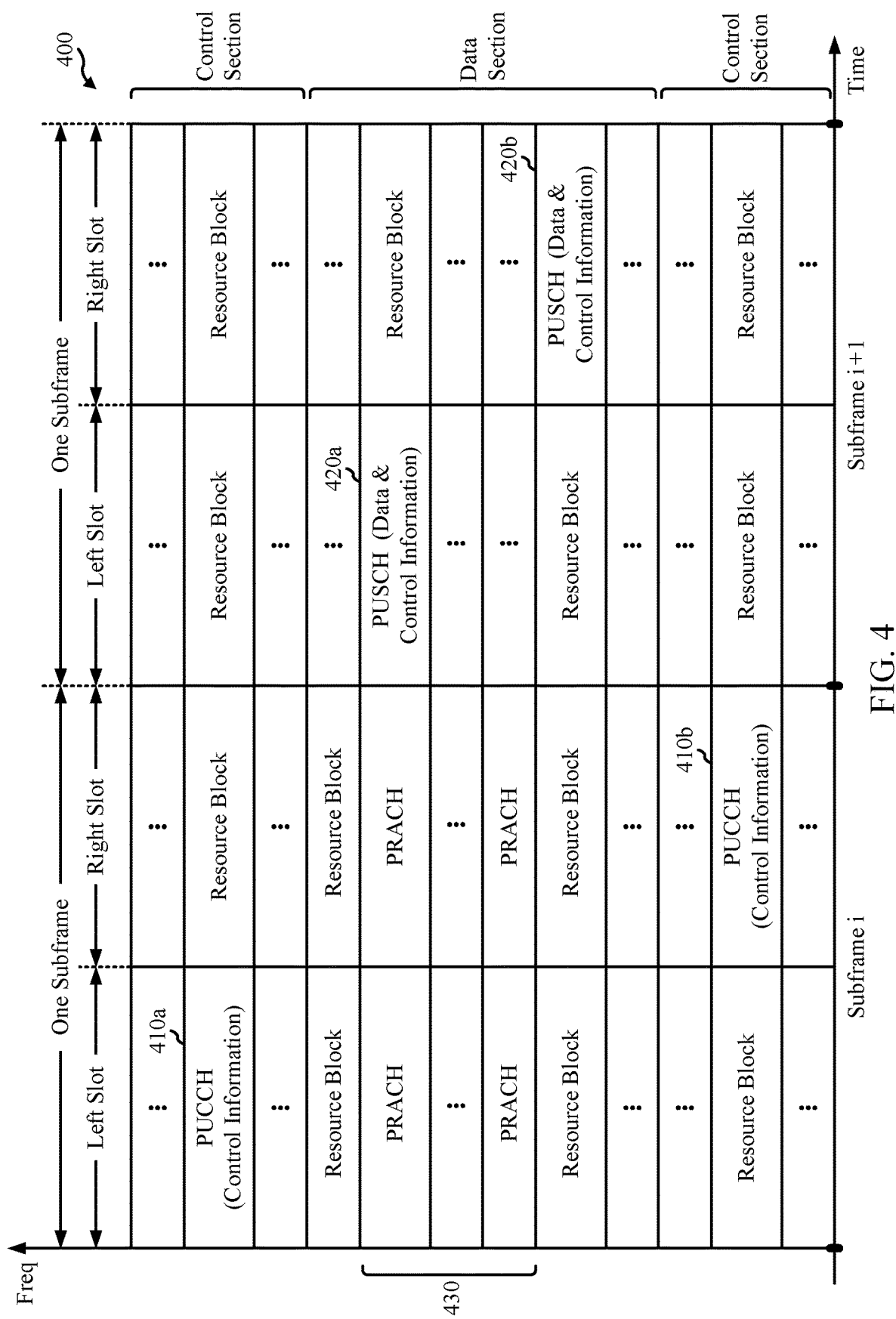
FIG. 4 is a diagram illustrating an example of an UL frame structure, according to some aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
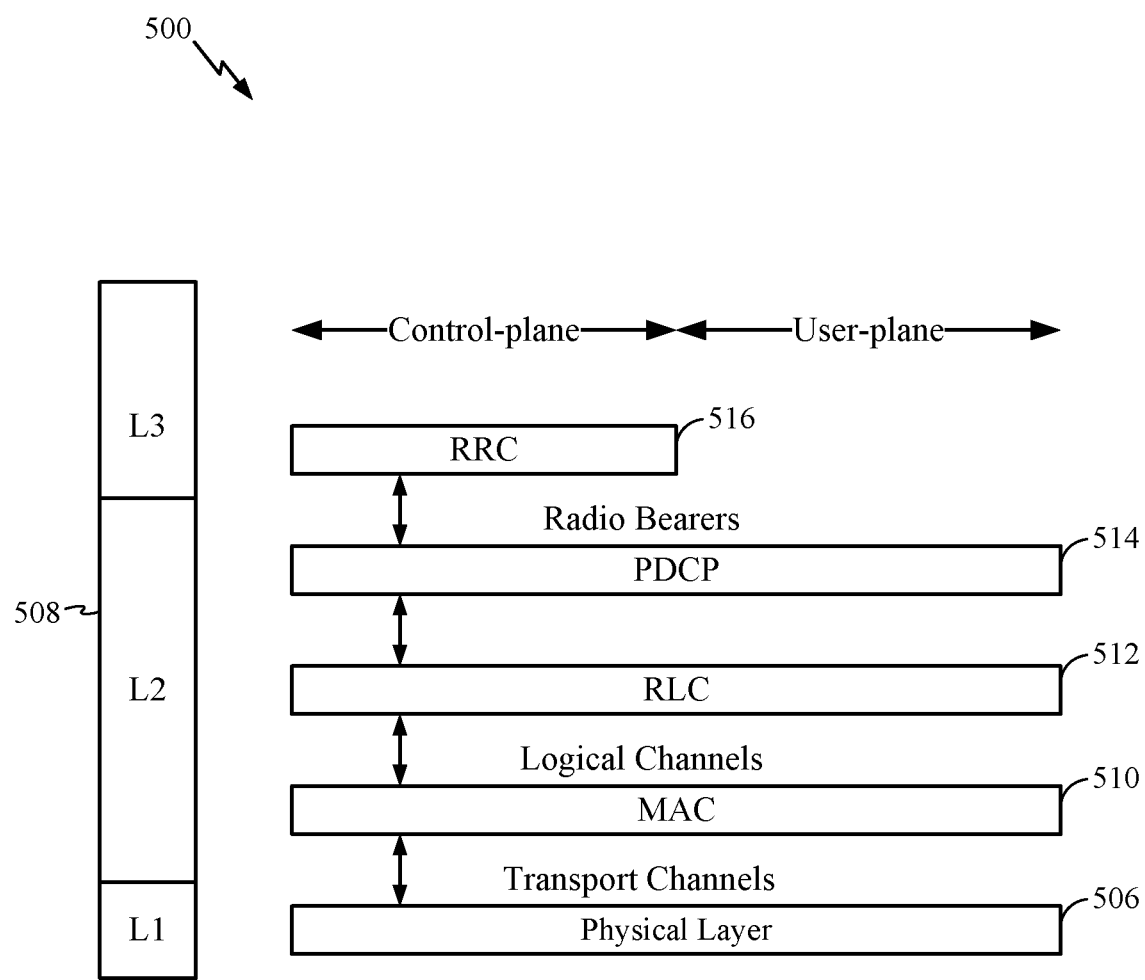
FIG. 5 is a diagram illustrating an example of a radio protocol architecture for the user and control plane, according to some aspects of the present disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
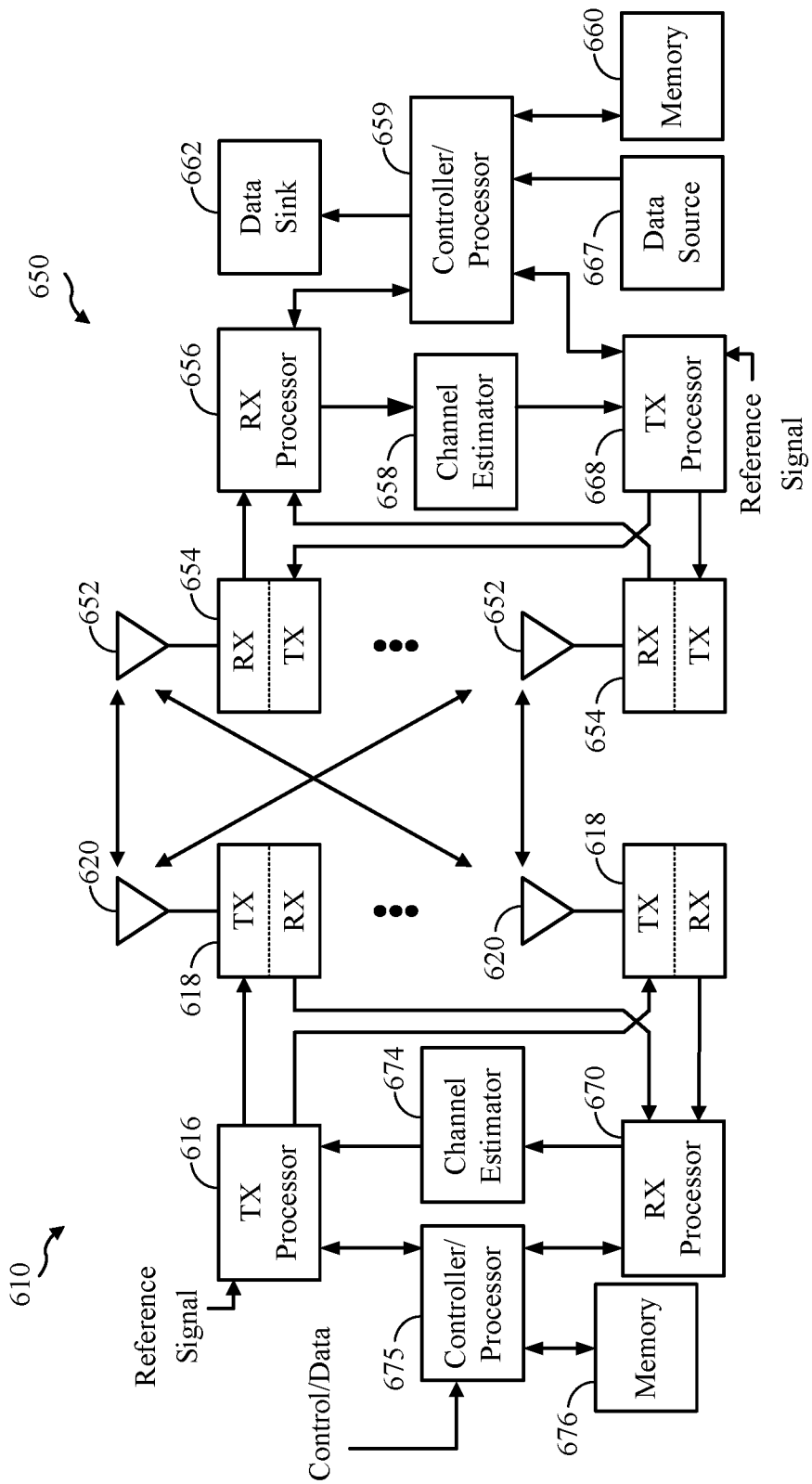
FIG. 6 is a diagram illustrating an example of a Node B and user equipment that may be embodiments of the present disclosure in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX may include one or more baseband (BB) filters and one or more phase-locked loops (PLL). The BB filters may be analog or digital filters and act to filter out unwanted frequencies from received radio waves. The PLL helps the receiver to match the frequency of a desired signal and to demodulate the signal. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Example Interference Management with Adaptive Resource Block Allocation

Cross interference, also referred to as mixed interference, causes issues in communication systems. This type of interference is usually between transmissions to a device in one cell and transmissions from a device in a different cell. This type of interference in TDD systems can result from UEs and/or BSs operating in a same frequency channel or adjacent frequency channels. In synchronized deployments, i.e., where neighboring BSs use a common time source and TDD subframe configuration, typical cross interference is "DL-to-DL" and/or "UL-to-UL" interference. These types of interference are typically managed (e.g., reduced to levels allowing adequate wireless service to UEs in the cells) by one or more of several techniques. One technique to manage these types of interference is basing UE to serving cell association on strongest downlink signals. Other techniques for managing these types of interference include enhanced inter-cell interference coordination (eICIC) and advanced receivers for inter-cell interference management. Power control/shaping (e.g., of transmissions) and intra-cell orthogonalization of multiple downlinks within a cell (e.g., downlink transmissions within a cell are orthogonal because they are transmitted with OFDM) may also be used to manage these types of interference.

5G dynamic DL-UL switching schemes may cause co-channel mixed interference (MI), such as "UL-to-DL" and "DL-to-UL," across multiple cells. In 4G LTE and 5G deployments where adjacent channels are operated by two different operators, A and B, mixed interference (MI) may occur across cells of the different operators when the two operators operate TDD systems without synchronization, when the two operators operate synchronized TDD systems using different DL/UL subframe configurations, or when one operator operates a TDD system while the other operator operates an FDD system. When multiple operators control cells with adjacent channels in one area, the operators may configure their cells to be synchronized and use the same DL/UL subframe configurations, or the operators may leave sufficient guard band between adjacent channels to mitigate mixed interference. Coordination of cells operated by one operator and between operators is recommended for MI mitigation.

Figure 7:
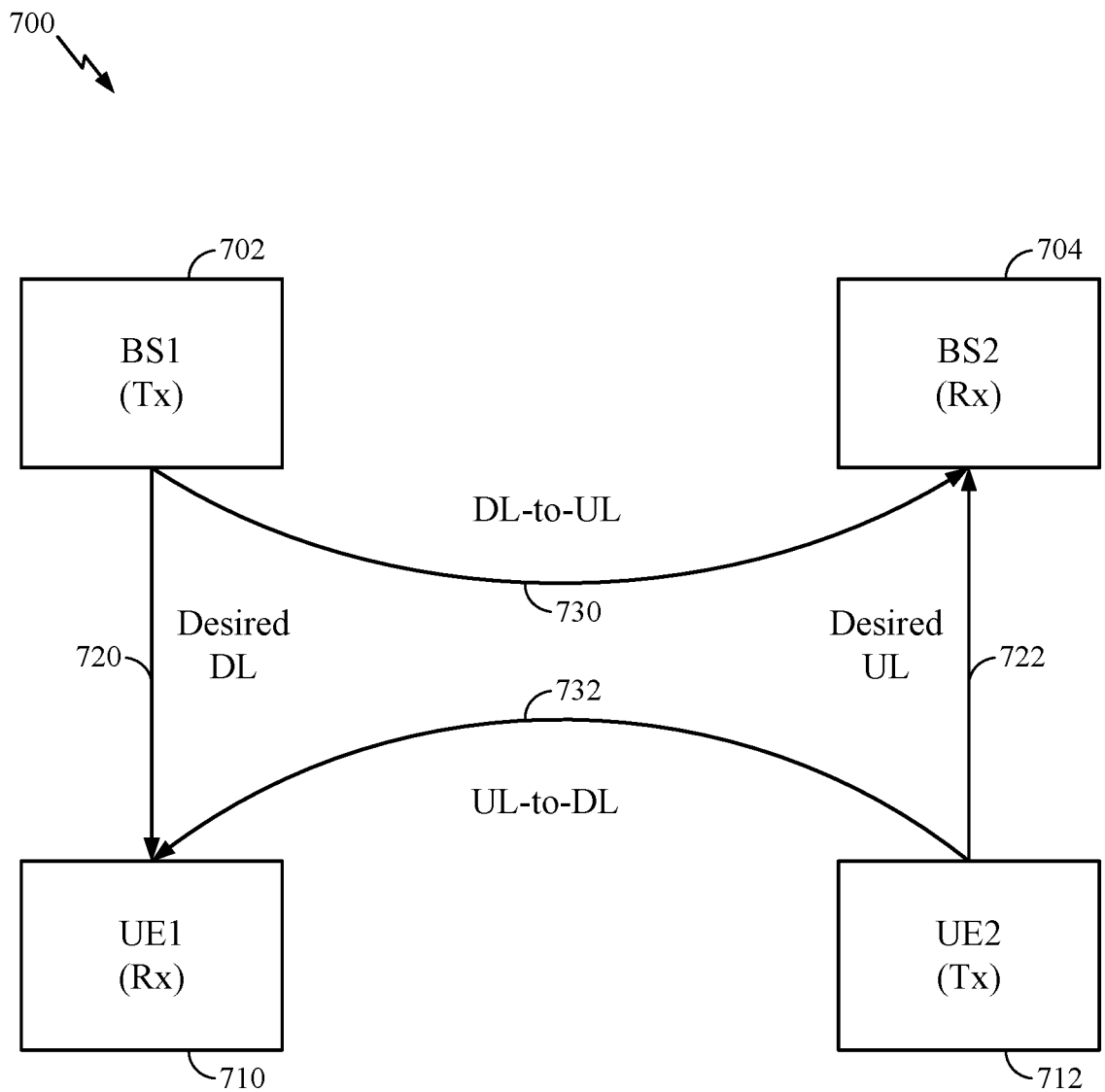
FIG. 7 is a schematic representation of an exemplary wireless communications system, in accordance with certain aspects of the present disclosure.

FIG. 7 is a schematic representation of an exemplary wireless communications system 700 in which some devices may experience mixed interference. The wireless communications system 700 includes two base stations 702, 704 and two UEs 710, 712, although a communications system could experience mixed interference with larger numbers of UEs and/or BSs. In the wireless communications system 700, BS 702 and BS 704 are utilizing dynamic DL-UL switching. The dynamic DL-UL switching may result in BS 702 transmitting a downlink transmission 720 to UE 710 while UE 712 is transmitting an uplink transmission 722 to BS 704, as illustrated. Because UE 712 is transmitting uplink transmission 722, UE 710 experiences UL-to-DL MI 732 while receiving the DL transmission 720. Similarly, BS 704 experiences DL-to-UL MI while receiving the UL transmission 722 because BS 702 is transmitting the DL transmission 720.

Mixed interference may be categorized as co-channel interference or adjacent channel interference. In co-channel interference, a transmission that is not directed to a receiver (i.e., an undesired transmission) is transmitted in the channel (e.g., a frequency band) of a transmission that is directed (i.e., a desired transmission) to the receiver, and the transmission that is undesired should be filtered out of the desired transmission by the receiver. In adjacent channel interference, an undesired transmission is transmitted in a channel that is near in frequency to a channel of a desired transmission, and adjacent channel leakage of secondary signals of the undesired transmission and aliasing and first receiver non-linearity related noise of secondary signals should be filtered out of the desired transmission by the receiver.

Figure 8A:
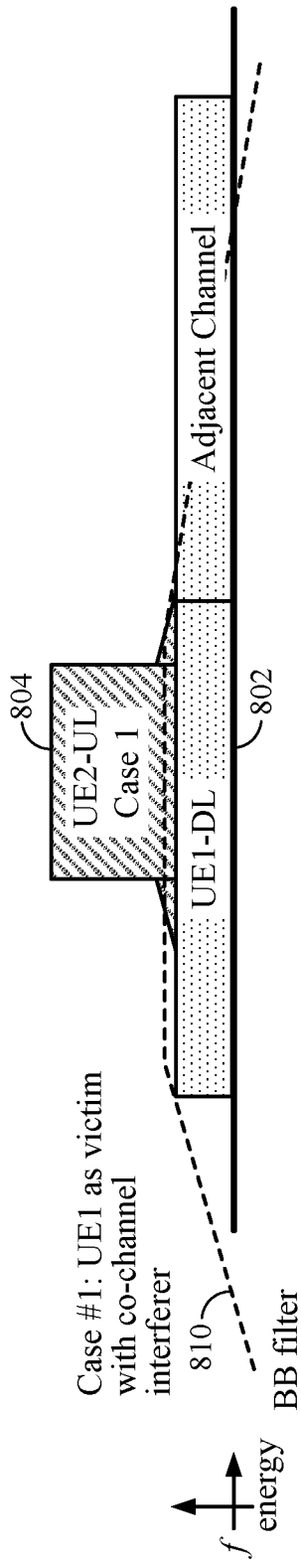
FIGS. 8A and 8B schematically illustrate co-channel interference and adjacent channel interference, in accordance with certain aspects of the present disclosure.
Figure 8B:
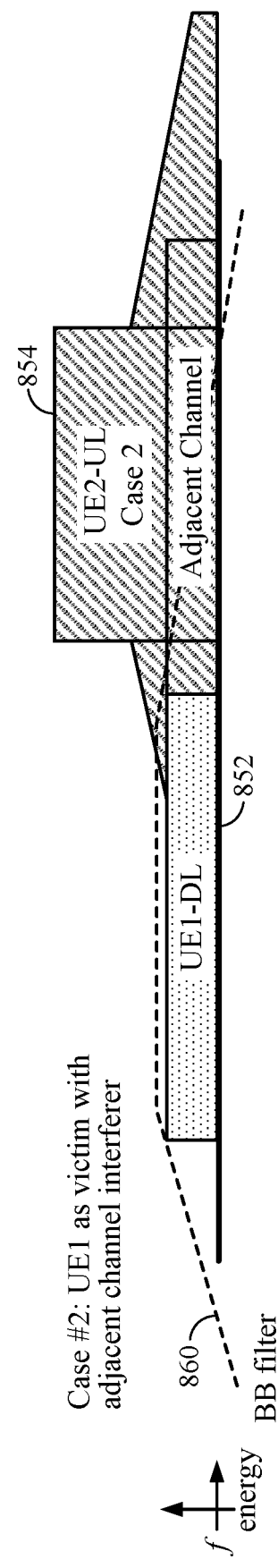

FIGS. 8A and 8B schematically illustrate co-channel interference and adjacent channel interference. FIG. 8A illustrates co-channel interference to a desired DL transmission 802 directed to UE1 being transmitted in the same channel (e.g., a frequency band) as an UL transmission 804 transmitted by UE2 that is not directed to UE1. A curve illustrating performance of an exemplary baseband (BB) filter of UE1 is shown with dashed lines at 810. The UL transmission from UE2 may have higher energy, as observed by UE1, than the DL transmission to UE1, if UE2 is nearer to UE1 than the BS which transmitted the DL transmission. A receiver of UE1 may have difficulty filtering out the UL transmission from the DL transmission, due to the higher energy of the UL transmission and the fact that the UL transmission is on frequencies that the desired DL transmission is on.

FIG. 8B illustrates adjacent channel interference to a desired DL transmission 852 directed to UE1 being transmitted in a channel adjacent to a channel being used for an UL transmission 854 transmitted by UE2, which is not directed to UE1. A curve illustrating performance of an exemplary baseband (BB) filter of UE1 is shown with dashed lines at 860. As above in FIG. 8A, the UL transmission from UE2 may have higher energy, as observed by UE1, than the DL transmission to UE1, if UE2 is nearer to UE1 than the BS which transmitted the DL transmission. Despite being transmitted in a different channel than the DL transmission, the UL transmission still interferes with the DL transmission, due to non-linearity, aliasing, and saturation of a receiver of UE1, as well as adjacent channel leakage (ACL) from the main channel into adjacent channels. However, because the undesired transmission is in an adjacent channel, the BB filter of UE1 may reject part of the interference from the UL transmission, and the receiver of UE1 may be more successful in rejecting the adjacent channel interference than UE1 is in rejecting co-channel interference.

According to aspects of the present disclosure, a wireless communications system may perform interference management with adaptive bandwidth (BW) and dynamic resource block (RB) allocations. RB allocations can be changed independently or coordinated in dynamic fashion. According to aspects of the present disclosure, a BS may initialize UL and DL bandwidth and RB locations changes based on a predefined matrix. A matrix can be determined by interference detected by the BS, based on interference detected by UEs and reported to the BS, or based on cross interference messaging (i.e., messages reporting interference to another BS or a UE served by another BS) received from other BSs. The matrix can be updated based on system design, implementation, or as otherwise determined.

According to aspects of the present disclosure, a BS may exchange information with one or more other BSs regarding planned transmission resource allocations in cells served by the BSs. For example, a BS may send information regarding timing, frequency, power level, and UL/DL direction of planned transmissions to other BSs, and the BS may receive similar information from the other BSs. In the example, the BS may also receive information regarding mixed interference experienced by the other BSs, by UEs served by the BS, and by UEs served by the other BSs. Still in the example, each BS may update resource allocations to mitigate mixed interference that would otherwise occur. The BSs may exchange the information regarding planned transmission and interference via X2 interfaces, for example.

According to aspects of the present disclosure a mobile (e.g., a UE) may request UL and DL bandwidth and RB location changes based on a predefined matrix or interference detected by the mobile and made known to a serving BS through mobile to BS messaging. For example, a UE (e.g., UE 710 shown in FIG. 7 or UE1) may detect an interfering transmission (e.g., transmission 722 shown in FIG. 7) while receiving a downlink transmission (e.g., transmission 720 in FIG. 7) and send a message to the BS requesting that the downlink transmission or future downlink transmissions be on RBs at a higher frequency to reduce the interference to the downlink transmission. In a second example, a UE (e.g., UE 710 shown in FIG. 7 or UE1) may obtain (e.g., the UE may be preconfigured with the matrix or the UE may determine the matrix by detecting transmissions over a period of time) a matrix indicating a probability (e.g., high or low) of mixed interference in a set of RBs. In the second example, the UE may receive an allocation from a BS for a DL transmission on one or more RBs that the matrix indicates have a high probability of mixed interference and the UE may send a message to the BS requesting that the allocation be changed to one or more RBs that the matrix indicates have a low probability of mixed interference.

According to aspects of the present disclosure, UL or DL RB allocation changes to perform interference management can be made independently by a BS or coordinated with other BSs in a network. For example, a first BS (e.g., BS 704 shown in FIG. 7 or BS2) may determine a change to an UL allocation to avoid interference and report the change in a message to a second BS (e.g., BS 702 shown in FIG. 7 or BS1). In the example, the change may move the UL allocation from a first RB to a second RB. Still in the example, the second BS may determine to change a DL allocation of the second RB to the first RB or to a third RB, in order to reduce the possibility of causing mixed interference to an UL transmission to the first BS on the second RB.

Figure 10:
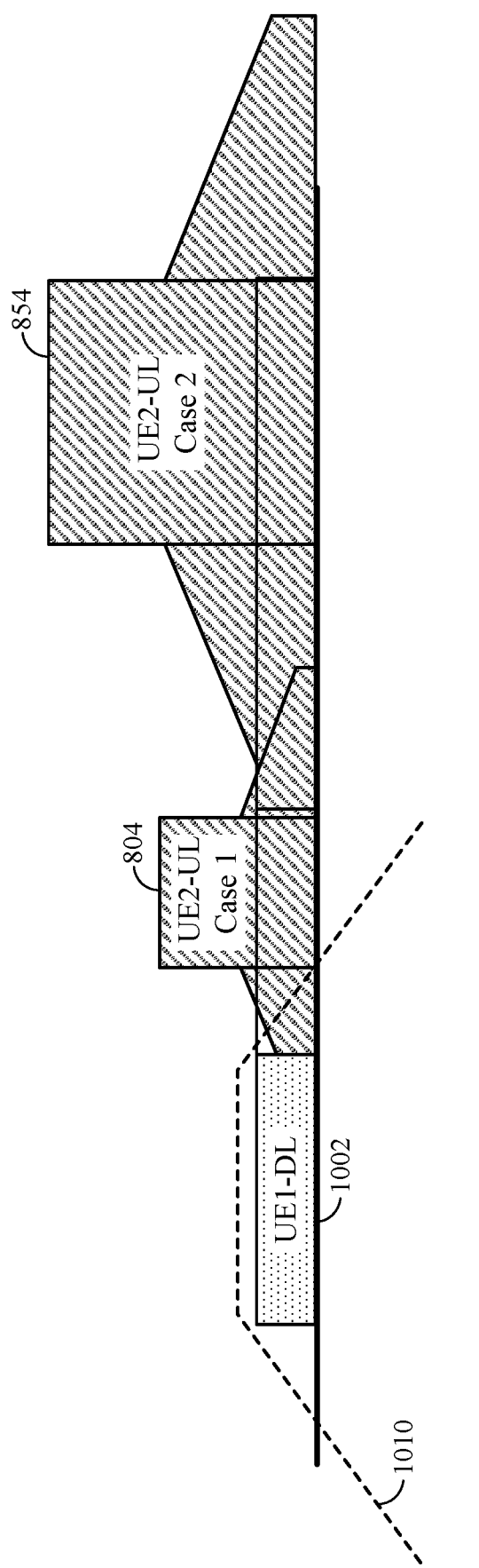
FIG. 10 illustrates adjacent channel interference, in accordance with certain aspects of the present disclosure.

According to aspects of the present disclosure, one or more BSs may perform adaptive RB allocation for "UL-to-DL" interference mitigation. A BS performing adaptive RB allocation may dynamically allocate DL RB resources to a first UE (e.g., UE 710 shown in FIG. 7 or UE1) and UL RB resources to a second UE (e.g., UE 712 shown in FIG. 7 or UE2) based on interference conditions. According to aspects of the present disclosure, a BS may perform adaptive RB allocation to change a same channel interference situation into an adjacent channel interference situation. That is, a BS that determines that a served UE or the BS itself is experiencing co-channel interference may dynamically allocate RB resources so that the served UE or BS experiences adjacent channel interference. For example and with reference to FIGS. 8A and 8B, a BS that determines a served UE, such as UE 802 in FIG. 8A, is experiencing co-channel interference may dynamically alter a DL allocation for the UE so that the DL transmission is no longer in the same channel as an interfering channel but is instead in an adjacent channel, such as shown in FIG. 10. Dynamically altering an allocation may include moving to other frequency resources, allocating a smaller bandwidth, and/or both.

According to aspects of the present disclosure, a BS operating using waveforms other than OFDM may perform dynamic bandwidth allocation and/or adaptive RB allocation. For example, a BS may perform dynamic bandwidth allocation and/or adaptive RB allocation when operating with generalized frequency division multiplexing (GFDM) waveforms, filter bank multi-carrier (FBMC) waveforms, and/or universal filtered multicarrier (UFMC) waveforms.

According to aspects of the present disclosure, a BS operating using multiple access schemes other than TDMA may perform dynamic bandwidth allocation and/or adaptive RB allocation. For example, a BS may perform dynamic bandwidth allocation and/or adaptive RB allocation when operating with non-orthogonal multiple access (NOMA), sparse code multiple access (SCMA), pattern division multiple access (PDMA), multi-user shared access (MUSA), and/or interleave division multiple access (IDMA).

Figure 9:
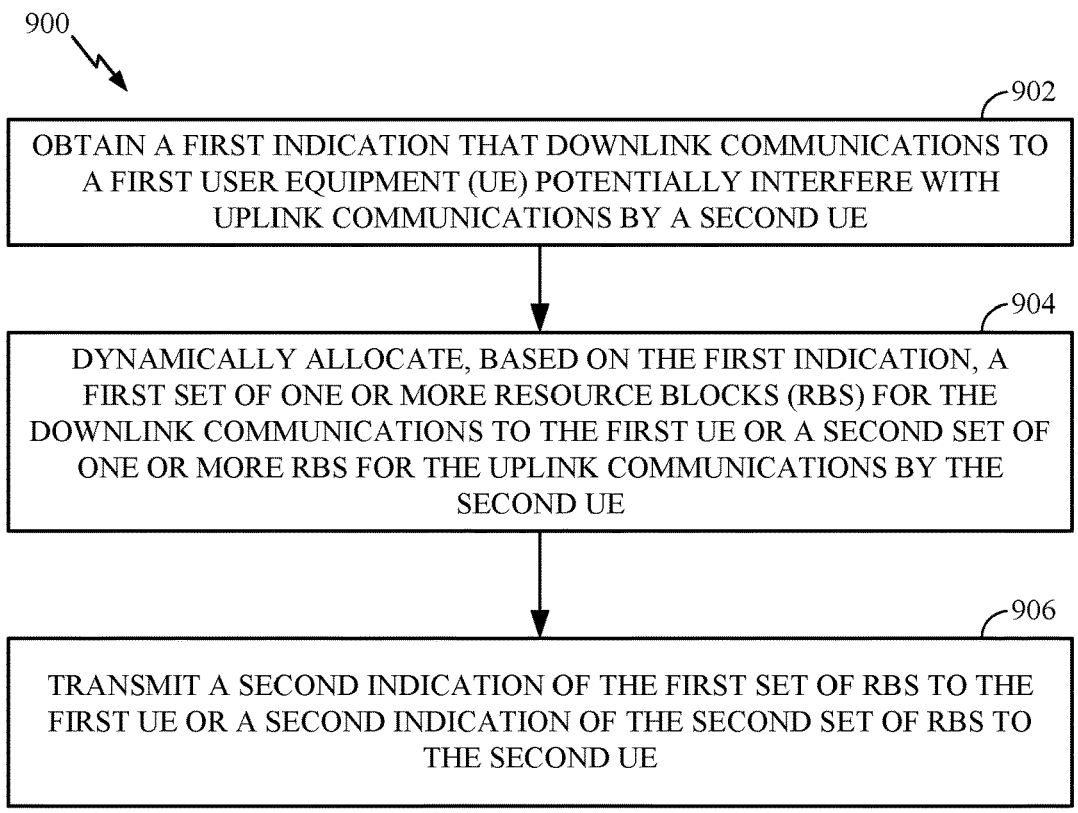
FIG. 9 illustrates an exemplary operation that may be performed by a BS, in accordance with certain aspects of the present disclosure.

FIG. 9 illustrates exemplary operation 900 for dynamic resource (e.g., bandwidth or RBs) allocation that may be performed by a BS, such as BS 610 shown in FIG. 6, according to aspects of the present disclosure. Operation 900 begins at block 902 by the BS obtaining a first indication that downlink communications to a first user equipment (UE) potentially interfere with uplink communications by a second UE. At block 904, the BS dynamically allocates, based on the first indication, a first set of one or more resource blocks (RBs) for the downlink communications to the first UE or a second set of one or more RBs for the uplink communications by the second UE. At block 906, the BS transmits a second indication of the first set of RBs to the first UE or a second indication of the second set of RBs to the second UE.

As used herein, "downlink communications that potentially interfere with uplink communications" refers to transmissions from a BS to a UE that may cause interference to transmissions from a UE to a BS (either that BS or another BS). If a first device (e.g., a BS) transmits during a time period on a first frequency and a second device (e.g., a UE) transmits during the time period on a second frequency that overlaps the first frequency or is near the first frequency, then a third device desiring to receive the transmission from the first device may be unable to receive and successfully decode the transmission from the first device. Determining that the first transmission actually interferes with the second transmission is problematic unless a device (e.g., the third device) fails at receiving and decoding the first transmission. Thus, according aspects of the present disclosure, a first transmission "potentially interferes" with a second transmission if the first transmission is during a same time period as the second transmission and on a frequency overlapping or near a frequency of the second transmission.

According to aspects of the present disclosure, a UE may make adaptive configuration changes in hardware (e.g., a receiver, a receive processor) of the UE to improve performance when experiencing adjacent channel interference.

According to aspects of the present disclosure, a UE performing adaptive configuration changes may switch to a narrower BB analog filter from a BB analog filter previously in use. That is, a UE may switch to a narrower BB analog filter in order to more effectively reject adjacent channel interference. A narrower bandwidth in a BB analog filter may provide better interference rejection at a same frequency offset.

According to aspects of the present disclosure, a UE performing adaptive configuration changes may switch to a narrower digital filter from a digital BB filter previously in use. A narrower bandwidth in a BB digital filter may provide better interference rejection at a same frequency offset.

FIG. 10 illustrates adjacent channel interference to a desired DL transmission 1002 directed to UE1. The DL transmission is being transmitted via dynamically allocated RBs, as previously described. That is, a BS determined that UE1 was experiencing MI and dynamically allocated a narrower set of RBs for UE1 to receive the DL transmission. Thus, and with reference to FIG. 8A, the DL transmission is transmitted in a channel adjacent to a channel being used for an UL transmission 804 transmitted by UE2, which is not directed to UE1.

A curve illustrating performance of an exemplary baseband (BB) filter of UE1 using a narrower bandwidth is shown with dashed lines at 1010. As above in FIG. 8A, the UL transmission from UE2 may have higher energy, as observed by UE1, than the DL transmission to UE1, if UE2 is nearer to UE1 than the BS that transmitted the DL transmission. Despite being transmitted in a different channel than the DL transmission, the UL transmission still interferes with the DL transmission, due to adjacent channel energy leakage from the main channel into adjacent channels, as well as non-linearity, aliasing, and saturation, in the presence of a higher energy transmission in an adjacent channel, of the receiver of UE1. However, because the undesired transmission is in an adjacent channel and the BB filter is using a narrower bandwidth, the BB filter of UE1 may reject part or most of the interference from the UL transmission, and the receiver of UE1 may be more successful in rejecting the adjacent channel interference shown in FIG. 10 than UE1 is in rejecting the co-channel interference shown in FIG. 8A.

Figure 11:
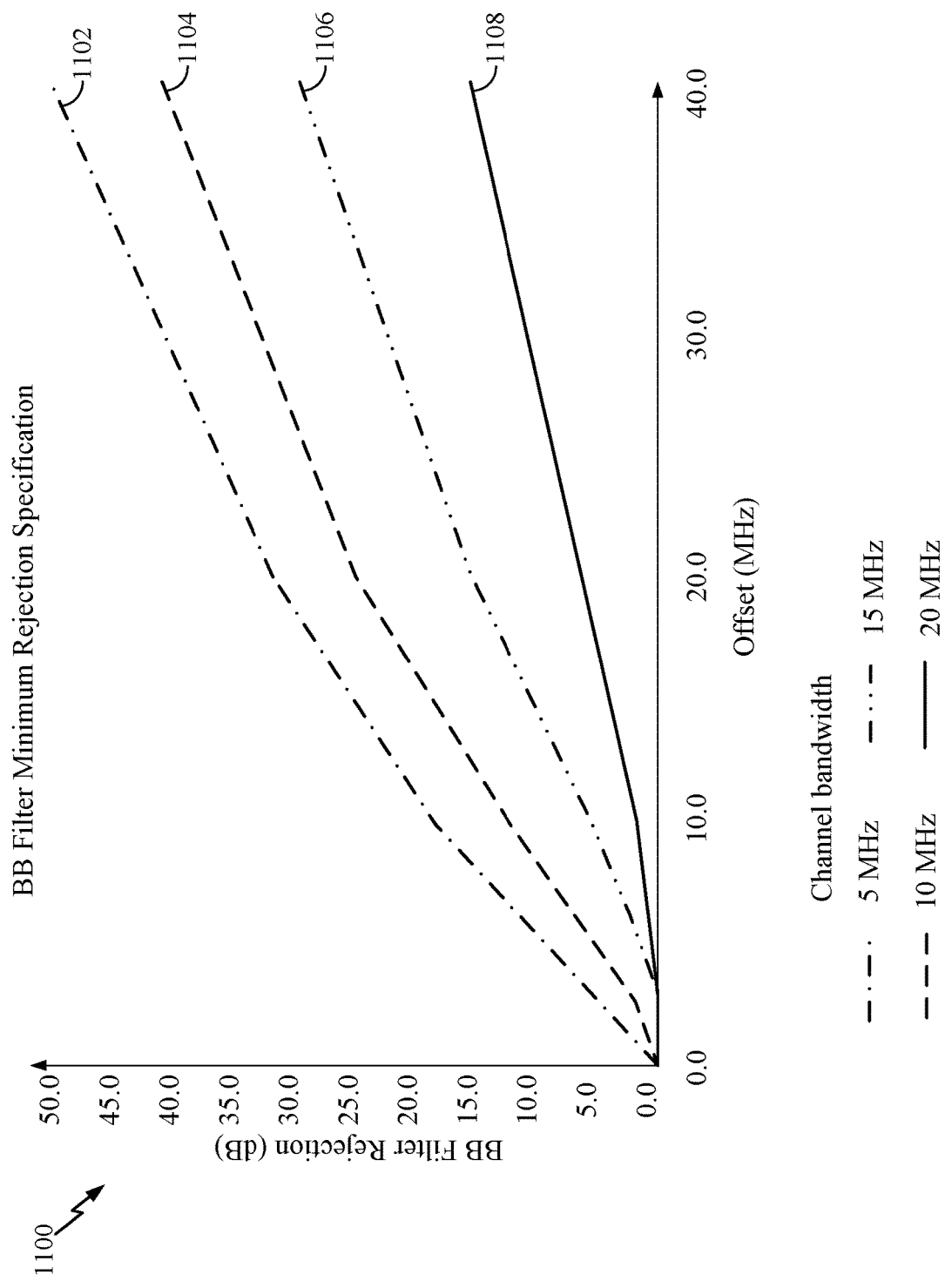
FIG. 11 is a graph showing baseband minimum rejection of an exemplary baseband (BB) filter, in accordance with aspects of the present disclosure.

FIG. 11 is a graph 1100 showing baseband minimum rejection of an exemplary baseband (BB) filter, in accordance with aspects of the present disclosure. A curve 1102 shows minimum rejection of an interfering channel by the BB filter when receiving a desired 5 MHz channel for various offsets between the interfering channel and the desired 5 MHz channel. Curve 1104 shows minimum rejection of an interfering channel by the BB filter when receiving a desired 10 MHz channel for various offsets between the interfering channel and the desired 10 MHz channel. Curve 1106 shows minimum rejection of an interfering channel by the BB filter when receiving a desired 15 MHz channel for various offsets between the interfering channel and the desired 15 MHz channel. Curve 1108 shows minimum rejection of an interfering channel by the BB filter when receiving a desired 20 MHz channel for various offsets between the interfering channel and the desired 20 MHz channel. As can be seen by examining the various curves, increasing an offset between a desired channel and an interfering channel typically increases effectiveness of a BB filter in rejecting the interfering channel. For example, when receiving a 5 MHz channel, increasing an offset to an interfering channel from 10 MHz to 20 MHz increases the rejection by the filter from approximately 18 dB to approximately 32 dB. In addition, decreasing the bandwidth of the desired channel also increases effectiveness of a BB filter in rejecting the interfering channel. In a second example, decreasing a desired channel's bandwidth from 10 MHz to 5 MHz, while maintaining an offset to an interfering channel of 10 MHz, increases effectiveness of a BB filter in rejecting the interfering channel from approximately 10 dB to approximately 18 dB.

Figure 12:
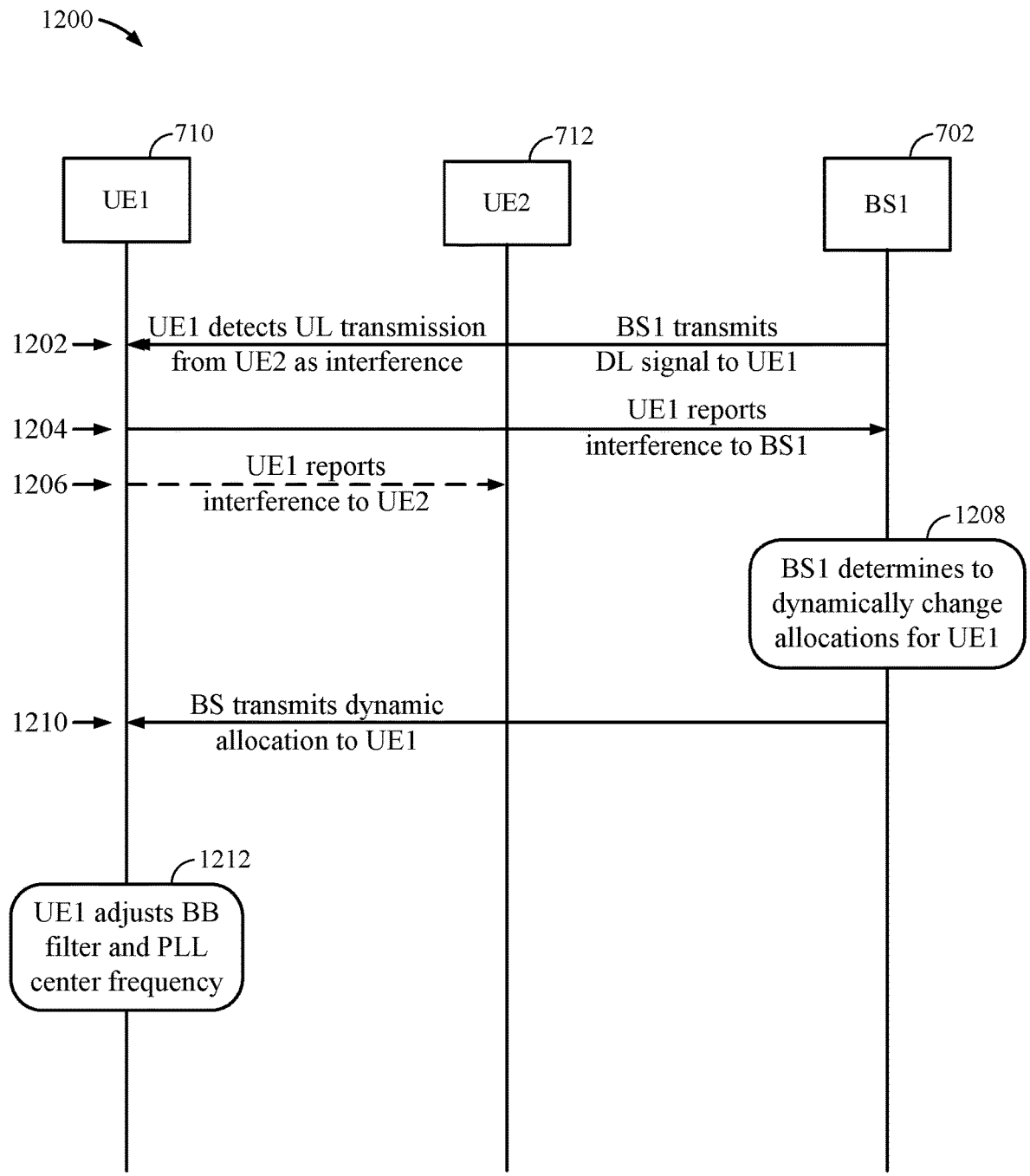
FIG. 12 shows an exemplary call flow of an exemplary wireless communication system in which aspects of the present disclosure may be practiced.

FIG. 12 shows an exemplary call flow 1200 of an exemplary wireless communication system in which aspects of the present disclosure may be practiced. The exemplary wireless communication system includes a BS (e.g., BS 702 shown in FIG. 7 or BS1) and two UEs (e.g., UEs 710 and 712 shown in FIG. 7 or UE1 and UE2). At time 1202, UE2 transmits an UL signal. At the same time 1202, BS1 transmits a DL signal to UE1. UE1 detects the UL signal from UE2 as interference. At time 1204, UE1 reports to BS1 the interference caused by the UL signal from UE2. UE1 may optionally report the interference to UE2 at time 1206. After receiving the report of the interference from UE1, BS1 determines to dynamically change allocations for UE1 at 1208. For example, BS1 may reduce the size of a downlink grant to UE1 and change the center frequency, so as to change the interference caused by the uplink transmission by UE2 from co-channel interference to adjacent channel interference (i.e., as shown in FIG. 8B). At 1210, BS1 transmits the (changed) dynamic allocation to UE1. At 1212, UE1 may adjust a baseband filter and/or a phase-locked loop center frequency to receive downlink transmissions sent according to the dynamic allocation.

According to aspects of the present disclosure, a UE performing adaptive configuration changes may switch a PLL of a receiver of the UE to a new center frequency. A UE that is an embodiment of the present disclosure may comprise a receiver having a PLL that supports sub-channel step sizes and has a center frequency settle time of a few microseconds (for example, 5 microseconds). A PLL that supports sub-channel step sizes may allow a UE to select from a larger number of center frequencies when performing adaptive configuration changes as compared to a UE having a PLL that does not support sub-channel step sizes. A PLL that has a center frequency settle time of about 5 microseconds may allow a UE to rapidly switch center frequencies while receiving transmissions in consecutive subframes.

According to aspects of the present disclosure a UE (e.g., UE 712 shown in FIG. 7), which is transmitting an uplink transmission and operating under a same service provider as another UE experiencing MI, may switch to a new center frequency and transmit on a narrower RB allocation than the UE was originally allocated. By doing so, the UE may reduce the MI experienced by the other UE. A UE that is an embodiment of the present disclosure may comprise a transmitter having a PLL that supports sub-channel step sizes.

According to aspects of the present disclosure, a UE experiencing MI may change a sampling frequency in a receiver of the UE. Changing sampling frequency may allow a UE to reject adjacent channel interference more effectively and potentially improve (e.g., reduce) analog-to-digital converter/digital-to-analog converter (ADC/DAC) power consumption.

According to aspects of the present disclosure, a UE operating using waveforms other than SC-FDM may perform adaptive configuration changes (e.g., switching to a narrower BB filter, changing center frequency of a PLL). For example, a UE may perform adaptive configuration changes when operating with generalized frequency division multiplexing (GFDM) waveforms, filter bank multi-carrier (FBMC) waveforms, and/or universal filtered multicarrier (UFMC) waveforms.

According to aspects of the present disclosure, a UE operating in a wireless system that uses multiple access schemes other than TDMA may perform adaptive configuration changes. For example, a UE may perform adaptive configuration changes when operating in a wireless system using non-orthogonal multiple access (NOMA), sparse code multiple access (SCMA), pattern division multiple access (PDMA), multi-user shared access (MUSA), and/or interleave division multiple access (IDMA).

According to aspects of the present disclosure, a UE experiencing strong interference may experience a saturation of an analog-to-digital converter (ADC) of a receive chain. According to aspects of the present disclosure, a UE experiencing ADC saturation may switch between a high linearity mode and a low linearity mode, based on an amount of power detected (e.g., by a power detector) in the receive frequency band. A UE that is an embodiment of the present disclosure may include an M-path BB filter, wherein additional paths are switched in to activate a high linearity mode.

Figure 13:
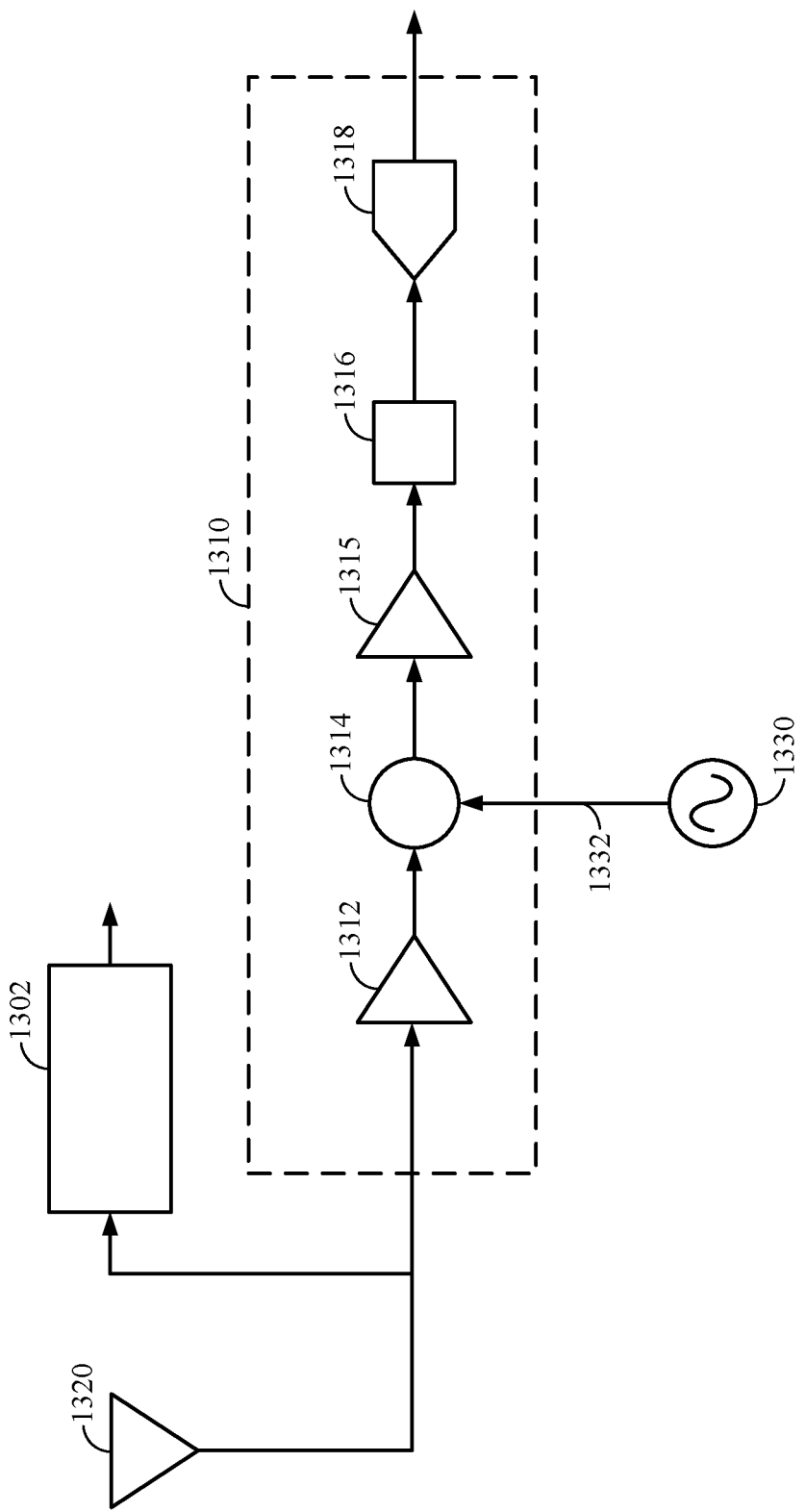
FIG. 13 illustrates exemplary components that may be included in a UE, in accordance with certain aspects of the present disclosure.

FIG. 13 illustrates an exemplary jammer detector (e.g., a power detector) 1302 and an exemplary receive (RX) path 1310 that may be included in a UE that is an embodiment of the present disclosure. For example, the jammer detector and receive path may be included in receiver 654 of UE 650, shown in FIG. 6. A receiver such as receiver 654 may include one or a plurality of receive paths, and the jammer detector may be connected with all of the receive paths. The RX path 1310 includes a low noise amplifier (LNA) 1312, a mixer 1314, one or more baseband amplifiers (BBAs) 1315, a baseband filter (BBF) 1316, and an analog-to-digital converter (ADC) 1318. The LNA, the mixer, the BBAs, the BBF, and the ADC may be included in a radio frequency integrated circuit (RFIC), which may or may not include transmit (TX) path components. RF signals received via one or more antennas 1320 may be amplified by the LNA, and the amplified RF signals may then be mixed by the mixer with a receive local oscillator (LO) 1330 signal 1332 to convert the RF signal of interest to a different baseband frequency (i.e., downconvert). The baseband signals output by the mixer may be further amplified and filtered by the BBAs and BBF before being converted by an analog-to-digital converter (ADC) 1318 to digital signals for digital signal processing. As described above, the jammer detector may detect a power level being received and adjust a number of receive paths, based on the detected power level. As previously described, adjusting the receive paths may include, for example, switching to a narrower BB analog filter, switching to a narrower BB digital filter, switching a PLL of a receiver to a new center frequency, changing a sampling frequency in a receiver, switching between a high linearity mode and a low linearity mode with different gain distributions, and/or switching in or out of n-path filters.

Figure 14:
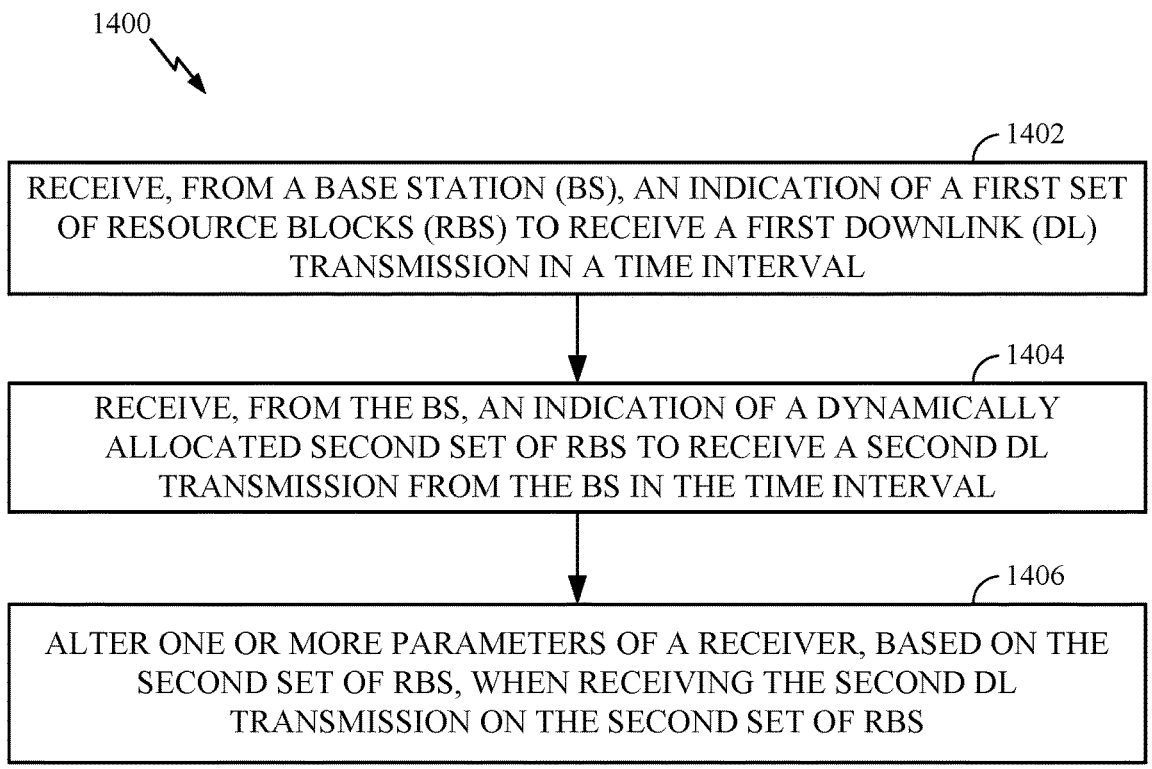
FIG. 14 illustrates example operations performed by a user equipment (UE), in accordance with certain aspects of the present disclosure.

FIG. 14 illustrates example operation 1400 for adaptive configuration changes that may be performed by a UE, such as UE 650 shown in FIG. 6, for example. Operation 1400 begins at block 1402 by the UE receiving, from a base station (BS), an indication of a first set of resource blocks (RBs) to receive a first downlink (DL) transmission in a time interval. At block 1404, the UE receives, from the BS, an indication of a dynamically allocated second set of RBs to receive a second DL transmission from the BS in the time interval. At block 1406, the UE alters one or more parameters of a receiver, based on the second set of RBs, when receiving the second DL transmission on the second set of RBs According to aspects of the present disclosure, a BS operating on a channel (e.g., a bandwidth) using waveforms other than OFDM, which is deployed near an unsynchronized BS or a synchronized BS using a different DL/UL subframe configuration that is operating on an adjacent channel, may perform dynamic bandwidth allocation and/or adaptive RB allocation when a small or no additional guard band is allocated between the two channels.

According to aspects of the present disclosure, a BS operating on a channel (e.g., a bandwidth) using multiple access schemes other than TDMA, which is deployed near an unsynchronized BS or a synchronized BS using a different DL/UL subframe configuration that is operating on an adjacent channel, may perform dynamic bandwidth allocation and/or adaptive RB allocation when a fixed additional guard band is allocated between the two channels.

In a network that has neighboring cells using identical DL/UL subframe configurations, "DL-to-DL" and "UL-to-UL" interference may occur, for example, when two UEs served by different cells are near each other and near a cell boundary. According to aspects of the present disclosure, a BS operating in a network that has neighboring cells using identical DL/UL subframe configurations may perform dynamic bandwidth allocation and/or adaptive RB allocation, for example, in response to determining DL-to-DL and/or UL-to-UL interference is occurring.

According to aspects of the present disclosure, a UE operating in a network that has neighboring cells using identical DL/UL subframe configurations may request adaptive configuration changes, for example, in response to determining DL-to-DL and/or UL-to-UL interference is occurring. For example, a UE scheduled to receive a DL transmission may request a change to a center frequency or a bandwidth or both for the DL transmission, and a BS may honor the request by dynamically allocating RBs for the DL transmission, as previously described. In a second example, a UE scheduled to transmit an UL transmission may request a change to a center frequency or a bandwidth or both for the UL transmission, and a BS may honor the request by dynamically allocating RBs for the UL transmission, as previously described.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Figure 9A:
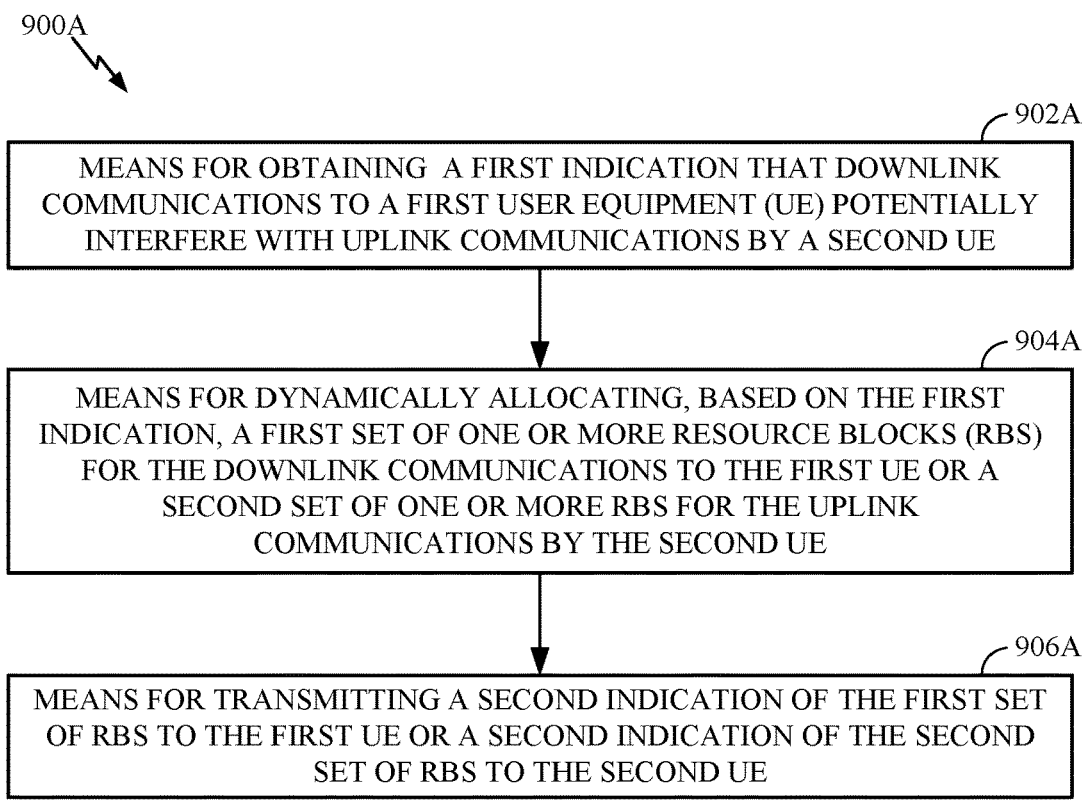
FIG. 9A illustrates example means capable of performing the operations shown in FIG. 9.
Figure 14A:
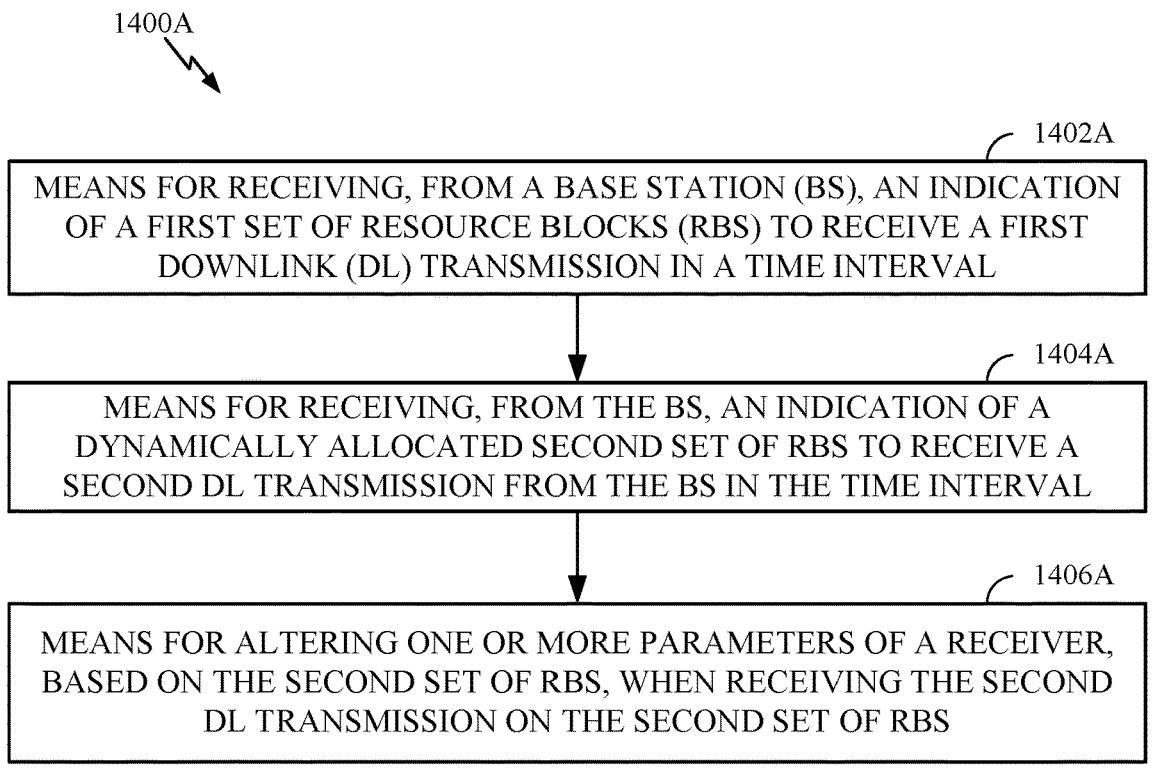
FIG. 14A illustrates example means capable of performing the operations shown in FIG. 14.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 900 illustrated in FIG. 9 correspond to means 900A illustrated in FIG. 9A, and operations 1400 illustrated in FIG. 14 correspond to means 1400A illustrated in FIG. 14A.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method for wireless communications by a base station (BS), comprising:
   obtaining a first indication that downlink communications to a first user equipment (UE) potentially interfere with uplink communications by a second UE;
   dynamically allocating, based on the first indication, a first set of one or more resource blocks (RBs) for the downlink communications to the first UE or for the uplink communications by the second UE via changing from an allocation of a second set of RBs spanning a first bandwidth to an allocation of the first set of RBs spanning a second bandwidth smaller than the first bandwidth; and
   transmitting a second indication of the first set of RBs to the first UE or a second indication of the first set of RBs to the second UE.

2. The method of claim 1, further comprising:
   generating the first indication based on interference the BS detects.

3. The method of claim 1, further comprising:
   obtaining the first indication from at least one of the first UE, the second UE, or another BS.

4. The method of claim 1, further comprising:
   allocating the first set of RBs for the downlink communications to the first UE;
   dynamically allocating, based on the first indication, a third set of one or more RBs for uplink transmissions by the second UE; and
   transmitting a third indication of the third set of RBs to the second UE.

5. The method of claim 1, wherein dynamically allocating the first set of RBs to the first UE comprises changing from the allocation of the second set of RBs having a first center frequency to the allocation of the first set of RBs having a second center frequency different from the first center frequency.

6. An apparatus for wireless communications, comprising:
   a transmitter;
   a processor configured to:

obtain a first indication that downlink communications to a first user equipment (UE) potentially interfere with uplink communications by a second UE;

dynamically allocate, based on the first indication, a first set of one or more resource blocks (RBs) for the downlink transmissions to the first UE or for the uplink transmissions by the second UE via changing from an allocation of a second set of RBs spanning a first bandwidth to an allocation of the first set of RBs spanning a second bandwidth smaller than the first bandwidth; and cause the transmitter to transmit a second indication of the first set of RBs to the first UE or a second indication of the first set of RBs to the second UE; and a memory coupled with the processor.

7. The apparatus of claim 6, wherein the processor is further configured to:

generate the first indication based on interference the apparatus detects.

8. The apparatus of claim 6, wherein the processor is further configured to:

obtain the first indication from at least one of the first UE, the second UE, or a base station (BS).

9. The apparatus of claim 6, wherein the processor is further configured to:

allocate the first set of RBs for the downlink communications to the first UE;

dynamically allocate, based on the first indication, a third set of one or more RBs for uplink transmissions by the second UE; and cause the transmitter to transmit a third indication of the third set of RBs to the second UE.

10. The apparatus of claim 6, wherein the processor is configured to dynamically allocate the first set of RBs to the first UE by changing from the allocation of the second set of RBs having a first center frequency to the allocation of the first set of RBs having a second center frequency different from the first center frequency.

11. An apparatus for wireless communications, comprising:

means for obtaining a first indication that downlink communications to a first user equipment (UE) potentially interfere with uplink communications by a second UE;

means for dynamically allocating, based on the first indication, a first set of one or more resource blocks (RBs) for the downlink communications to the first UE or for the uplink communications by the second UE via changing from an allocation of a second set of RBs spanning a first bandwidth to an allocation of the first set of RBs spanning a second bandwidth smaller than the first bandwidth; and means for transmitting a second indication of the first set of RBs to the first UE or a second indication of the first set of RBs to the second UE.

12. The apparatus of claim 11, further comprising:

means for generating the first indication based on interference the apparatus detects.

13. The apparatus of claim 11, further comprising:

means for obtaining the first indication from at least one of the first UE, the second UE, or a base station (BS).

14. The apparatus of claim 11, further comprising:

means for allocating the first set of RBs for the downlink communications to the first UE;

means for dynamically allocating, based on the first indication, a third set of one or more RBs for uplink transmissions by the second UE; and means for transmitting a third indication of the third set of RBs to the second UE.

15. The apparatus of claim 11, wherein the means for dynamically allocating the first set of RBs to the first UE comprises means for changing from the allocation of the second set of RBs having a first center frequency to the allocation of the first set of RBs having a second center frequency different from the first center frequency.

* * * * *